April 2, 1946.　　　H. SCHRECK　　　2,397,511
GAS ENGINE
Filed July 11, 1941　　5 Sheets-Sheet 1

INVENTOR.
HENRY SCHRECK
BY
ATTORNEY

INVENTOR.
HENRY SCHRECK
BY
ATTORNEY

INVENTOR.
HENRY SCHRECK
BY
ATTORNEY

April 2, 1946.   H. SCHRECK   2,397,511

GAS ENGINE

Filed July 11, 1941   5 Sheets-Sheet 5

FIG.15. NO LOAD

FIG.21. 120% LOAD

CODE
AO – AIR VALVE OPENS
AC – AIR VALVE CLOSES
GO – GAS VALVE OPENS
GC – GAS VALVE CLOSES
CB – COMPRESSION BEGINS
BDC – BOTTOM DEAD CENTER
TDC – TOP DEAD CENTER

FIG.18. FULL LOAD

INVENTOR
HENRY SCHRECK
BY Paul L. Krohn
ATTORNEY

Patented Apr. 2, 1946

2,397,511

UNITED STATES PATENT OFFICE 2,397,511

GAS ENGINE

Henry Schreck, Beloit, Wis., assignor to Fairbanks, Morse & Co., Chicago, Ill., a corporation of Illinois Application July 11, 1941, Serial No. 401,884

3 Claims. (Cl. 123—90)

This invention relates to gas engines, and more particularly to methods of and means for proportioning air and gas in a mixture thereof for combustion in internal combustion engines of certain types in which a considerable excess of air, over combustion requirements, is desirably admitted to the cylinder prior to combustion. An example of this practice is found in prevalent types of port-scavenging engines, wherein the cylinder is desirably swept by a full charge of air for scavenging purposes, prior to compression.

Since the types of engine to which the present invention is applicable, are exemplified by two cycle, port-scavenging engines, but since the invention may also be embodied in engines of other types wherein an initially larger charge of air is introduced than is usually necessary or desirable for combustion, the reference herein to engines of two cycle type is to be understood as explanatory, and the phrase used for brevity, rather than with any intent to restrict the present developments specifically as to field of application and usage.

The invention is believed best understood by a brief reference to the nature of the problem encountered and the manner of its solution by present developments. Particularly in engines of two cycle type, difficulties have been experienced in attaining a satisfactorily low coefficient of speed fluctuation, particularly under light-load and no-load operation. In all two cycle gaseous fuel engines heretofore available to the trade or otherwise known to applicant, operation may be fairly successful and reasonably satisfactory under conditions, for example, of three-fourths normal rated loading or higher. Such engines however fail utterly of attaining a satisfactory coefficient of speed fluctuation, or any dependable regularity of firing in the lower load ranges, for example, below one-half or perhaps three-fourths load, depending upon size and exact construction of engine.

The difficulty last noted has been found by applicant to be due to poor proportioning of fuel and air, in that there has existed prevalently an improper ratio of fuel to air. More usually in the older and prevailing types of two cycle engines, this condition has existed primarily because of an incorrect proportioning of air charge, either or both to the gas charge and to then-prevailing engine loading. Because of this prevalent shortcoming, two cycle gas engines have long been considered unsuitable for use with any form of connected load which is at times required to operate appreciably below the normal rated maximum engine load, and which connected load is inherently such as to require a minimum fluctuation in speed from that currently predetermined, or otherwise expressed, is such as to require a minimum coefficient of speed-fluctuation. It has furthermore now been definitely established that gas engines, in distinction from internal combustion engines of liquid fuel type, whether utilizing fuel injection systems of so-called solid injection type, or utilizing a carbureted vapor, are much more subject to misfiring because of incorrect or improper air-fuel mixtures, than are internal combustion engines of the last mentioned types. Accordingly, the successful solution of the operational difficulties noted must include provisions for an accurate metering, particularly of the amount of air present just prior to combustion, and an equally accurate coordinated metering of the fuel supplied for combustion. This regulation must moreover be such as to result in a proportion of air and gas to each other, and a proportioning of each fluid to the then-prevailing engine load conditions, such as to bring the mixture with definiteness and certainty within the ignitable limits, or the limits of inflammability, of fuel-air ratios, throughout the full load range of the engine. The latter, it may be noted, is herein taken to include a lower limit of zero loading or idling condition of the engine, and an upper limit which is at least the normal full rated loading of the engine, even preferably including overloads of the order of twenty percent.

The invention accordingly has as its general and principal object, the attainment of an improved method of and structural arrangement for proportioning a gaseous fuel and air, both as to their mutual ratio, and each as to then-prevailing engine load conditions, in such manner as to result in dependable regularity of firing, and a dependably adequate coefficient of speed fluctuation, throughout the full load range of the engine.

Objectively a most important feature of present developments is an improved method of and means for measuring in the cylinder, a volume of air, or air charge, which when admixed with a metered charge of fuel, will result in the aforesaid operational advantages.

In comparison with four-cycle engines, all of the two-cycle gas engines heretofore available to the trade have been characterized by a marked tendency to misfire when operated appreciably below rated load. This adverse characteristic has been overcome, in a certain measure, but with only indifferent success, in certain types of two cycle gas engines wherein, for example, a small igniting charge of liquid fuel is injected with the gas. Such expedients obviously increase initial cost of the engine as well as its expense of maintenance and requirement of service attention. It is accordingly a further and important object of the invention to realize a novel type of two-cycle gas engine which offers all of the advantages of four-cycle gas engines, and yet retains all of the many advantages of those of two-cycle type, such as fewer parts and lesser maintenance attention.

Akin to and in keeping with the foregoing object, an important result attained by the present method and structure is found in engines of two cycle type, operating on any of a number of true gaseous fuels (as hereinafter defined), and which while possessing the mechanical simplicity and freedom from service attention of a two cycle engine, has demonstrated in commercial service a fuel economy which compares more than favorably with four cycle engine fuel consumption under comparable operating conditions. Stated in terms of structure and method of operation this result, attained for the first time in a commercial engine operating on a true gaseous fuel, is due in part to careful preservation of gas-air mixture safely without ignitible proportions, under all possible load conditions. This objective is further contributed to by strict avoidance of any communication, at any time, between the gaseous fuel or any mixture thereof, and the exhaust system.

Still other objects, some of which may be considered related to the foregoing, include the provision of an improved method of and means for definitely establishing the volume of, regulating or metering the air charge in the cylinder of the engine through a wide or substantial range of air amounts or volumes, in order to care for conditions prevailing through the entire engine load range. The preferred and most advanced practice of metering air for the purpose noted in attainment of the present object includes an air volume regulation and means for effecting same by the release or discharge of any air which is in excess of that required for combustion under then prevailing load conditions, such excess air being a portion of an initially plenary volume thereof. In this manner the air remaining in the cylinder prior to ignition, hence prior to combustion is, if necessary, reduced to such a volume or amount, as will result in easy and certain ignitibility of the gas-air charge. The greatest nicety of air metering in accordance with present improvements also involves a variation in timing, in respect to engine crank travel, of the agencies by which a portion of the initial air charge is released from the cylinder; a regulation also of the rate of air egress during the step of reducing, if necessary, the air volume to bring it safely within the limits, in respect to the gas charge, of certain ignitability, and the completion of the air metering and final establishment of the then-correct air charge, preferably wholly prior to the introduction of any gaseous fuel, and substantially prior to ignition of the cylinder charge.

Yet another object of the invention, more particularly stated in reference to the apportionment of gas fuel charge, may be noted as attained in provisions for introducing the gas charge earlier or later either in reference to piston stroke or crank travel; the provision of means for regulating the rate of gas introduction to the cylinder, such rate being desirably variable under differing engine load conditions. The present improvements also objectively contemplate not only a variation in rate of gas influx, and an earlier or later beginning of gas introduction, but a differentially variable timing of the termination of gas introduction to the cylinder.

Expressed in terms of structure presently preferred to attain the operational objectives above noted, is an improved system of valve operation and control, the valves and valve-operating agencies being such as to attain in a simplified manner and under a great variety of engine operating conditions, a proportion of air to gas, which is always within limits of ignitability, and which are yet safely between those high and low ratios which define the limits of inflammability of the gas utilized.

Somewhat subordinate to the foregoing general object, and yet being of objective importance in the form of assembly selected as a present embodiment, are improved designs of the valve operating cams, particularly found in the shaping or contouring of the lobes or active profile portions of the cams employed in conjunction with the valves for metering predetermined amounts of combustion air, and for proportioning the gaseous fuel charge thereto.

The foregoing and numerous other objects will more clearly appear from the following detailed description of an engine and method of operating same, particularly when considering the description in connection with the accompanying drawings, in which:

Figs. 13, 14 and 15 constitute a group of related diagrams showing cylinder positions of the piston in relation to opening and closing times of the air and gas valves, Fig. 13 showing in full lines the piston position at the beginning of gas injection, while Fig. 14 shows a position of the piston near top dead center, and Fig. 15 showing a pressure card or diagram on which is superposed an indication of time of the various valve opening and closing events, the three figures of this group all relating to "no load" engine operating conditions.

Before describing by characters of reference a selected embodiment of the invention in a port-scavenging gaseous fuel engine, it should first be stated that the expression "gaseous fuel" as utilized in the present disclosure and appended claims, has reference to any fuel of a type which exists and remains until burning, in a gaseous, as distinguished from vaporous or liquid condition, throughout all reasonable extremes of temperature. Otherwise defined, for purposes of present description and claims, a true gas, or gaseous fuel, may be considered as a fluid which, under ordinary ambient pressures and temperatures, has "neither independent shape nor volume, but tends to expand indefinitely." (Webster.) By way of still further definition, the substances to and with which the present engine developments are applicable, consist of those gaseous substances suitable for internal combustion engine fuels which are composed for the greater part, say at least 95%, of an ingredient or ingredients having a molecular weight not exceeding 75. This definition is to be understood in connection with the present description, developments, and in the appended claims, to embrace gases of fixed formulae and composition, or mixtures thereof, as well as industrial or other gases usually composite in nature; it being the intent of this definition to include therein those fuels which, within the range of atmospheric temperatures encountered in the United States, and at atmospheric pressures, normally exist and are or may be commercially handled as gases, in distinction from liquids and solids, in the sense that true gaseous fuels are understood in present accepted or developed meaning, by those particularly skilled in the art of gas engine design and operation. As typical of fuels of gaseous type contemplated in connection with present improvements, there may be mentioned as illustrative, but not as exhaustive, those ranging from, say blast furnace gas up through gaseous fuels of the highest calorific value. These include illuminating gas whether coal gas, water gas or mixtures of same; so-called bottled gases, natural gases, and many others. The engine illustrated, since the drawings are partly taken from an operating engine, may be noted as designed particularly for and as having most successfully operated on a fifty percent dilution of butane. The latter in pure state, having a calorific value approximating 3000 B. t. u., the engine selected for description has been successfully operated on gas of the calorific order of 1500 B. t. u. It is to be noted, however, that merely by changing or substituting cylinder valves and valve cages of greater or less diameters, the engine is easily adapted for the use of fuels of greater or less heat value. In order still further to attain a better understanding of the principles underlying the present improvements, it should be stated that the difficulties encountered, and the solution thereof which resulted in the present developments, are chiefly those attending the use of a gaseous fuel in an internal combustion engine, particularly one of port scavenging type. This fact is noted inasmuch as certain sporadic attempts have experimentally been made heretofore, to vary the volume of combustion air, in two-cycle Diesel type engines. Such attempts have led to no useful result, since an excess of combustion air is not only no disadvantage, but is in fact a desideratum in Diesel operation wherein it is desired to assure full or nearly full compression pressures under all load conditions of engine operation. Such fact arises in part out of the necessity for maintaining at all times, a full cylinder charge, in order to insure dependable compression ignition. Furthermore, and very importantly, it is to be noted that in Diesel operation, compression pressures being high enough to insure ignition, and a liquid fuel being employed, there will always obtain in some localized portion of the fuel spray and air intermixed therewith, a charge-kindling condition. This relation of fuel and air does not at all obtain with any uniformity in conventional gaseous fuel engines. Both fluids present being distinctly gaseous in nature, the relatively quick diffusion of gases occurring in the cylinder causes immediately upon introduction of gas to the cylinder, in case an excess of air be present, an air-gas mixture which is too lean to ignite, this condition being particularly prevalent at lighter loads, since, a lesser gas charge being present with the maximum cylinder volume of air, the proportion of gas to air fails even to attain the lower percentage of ignitability.

Proceeding now to describe the engine selected as an example to utilize present improvements, while portions of the engine may be of conventional or other suitable type or form, for completeness of description a portion of the crank case is indicated at 20 in which revolvably operates a crank shaft 21 provided with a crank 22, a conventional or other suitable rod 23 being connected through a wrist or piston pin (not shown) to piston 24. The latter reciprocates, according to well known practice, in the cylinder structure 25 provided with a cylinder head 26, and if electrical ignition be employed, igniters or spark plugs 30 are used, there being one or more per cylinder.

Shown as opening inwardly of the head 26 of the cylinder and into the combustion space 31, is a gas admission valve 32, engaging a suitable seat 33 and provided with an elongate valve stem 34 and valve seating spring 35. It will be noted that the valve 32 controls the opening and closing of a gas admission conduit 36 connected with a suitable supply of gas (not shown), if necessary, through a gas pump (not shown) in a line provided optionally with a gas pressure regulating valve (not shown) in case a high pressure gas source is utilized.

Arranged somewhat similarly to the gas admission control valve 32, is an air outlet valve or release valve, preferably considerably larger in diameter than the valve 32, and indicated at 45. The air-valve, so-called for convenience and brevity, cooperates with a seat 46 in controlling and metering a relief flow of air outwardly from the cylinder space 31, as will later better appear. The air valve 45 is also provided with a valve stem 47 and valve spring 50 tending, like spring 35, to urge the associated valve into closed position.

The valve actuating gear includes, for each of the valves 32 and 45, a rocker arm 51, provided with a tappet roller 52 engaging the upper or outer end of the valve stem to which it is related. Each rocker arm is suitably fulcrumed as on a pin 53 carried by a stand 54 in turn secured to the cylinder head 26; the opposite end of each rocker 51 is provided with a threaded adjusting member 55 having a ball connection 56 in an outer socketed end of a push rod 60. The inner or lower end of each rod 60 is mounted in a socket element 61 carried by a seat 62 therefor on a follower yoke 63, the follower yoke being mounted for a limited oscillatory movement about a pivot pin 64 suitably journalled in bearing webs 65 formed within a housing structure 66—67 in which operates the engine camshaft, hereinafter more fully described.

The outer free end portions or arms 70 of the yoke 63 are apertured to receive a stub shaft or axis pin 71 pinned as by a key 72 so as to retain the element 71 in axial position and against rotation in the yoke. The stub shaft 71 of each follower assembly serves to carry a pair of follower rollers 73, each roller 73 being journalled and freely rotatable on the element 71 and similarly free axially movable along this element for a purpose later appearing.

Figures 1, 2:
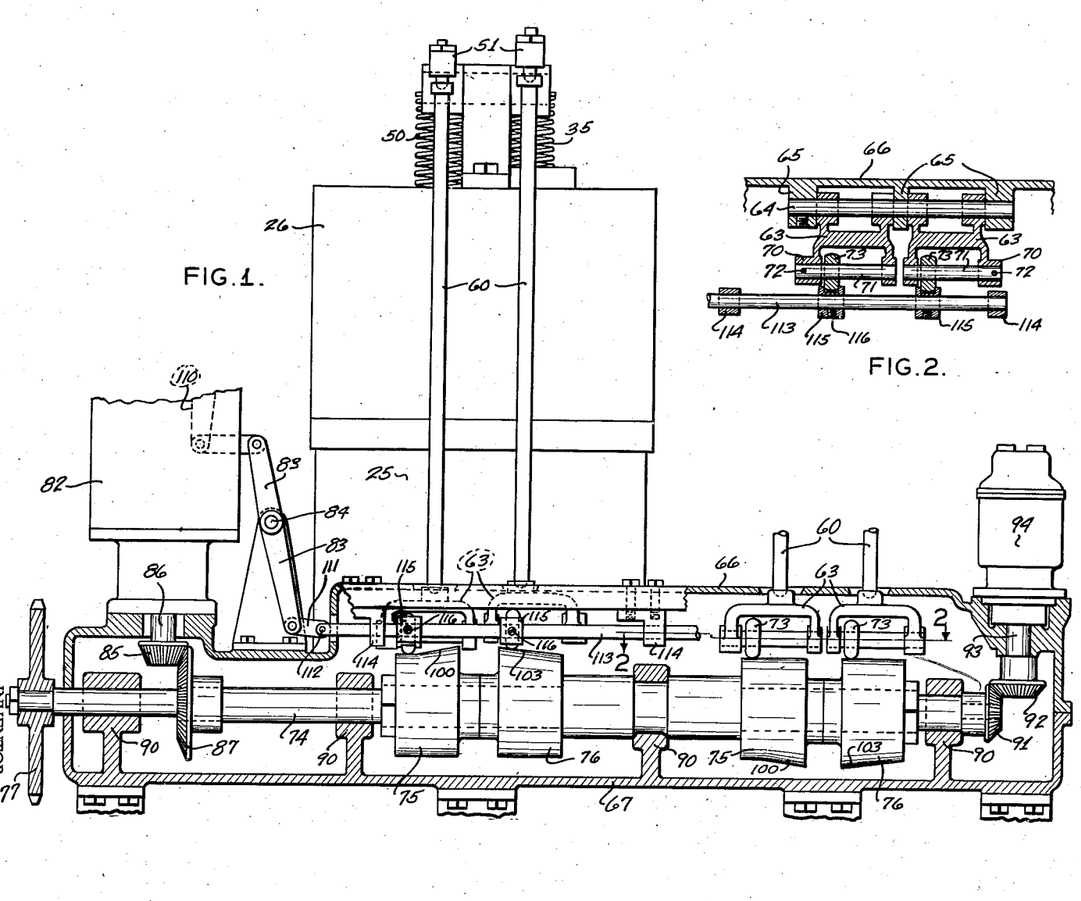
Fig. 1 is a side elevation, partly in section, of a portion of a two cylinder two cycle, port scavenging engine adapted to operate in accordance with the principles of the present invention, and embodying control and other structural assemblies thereof, the sectional portions of Fig. 1 being taken in a vertical plane axially of the camshaft.
Fig. 2 is a horizontal sectional view, fragmentary in nature, of a cam follower assembly associated with one of the engine cylinders and as viewed along line 2—2 of Fig. 1.
Figures 3, 4:
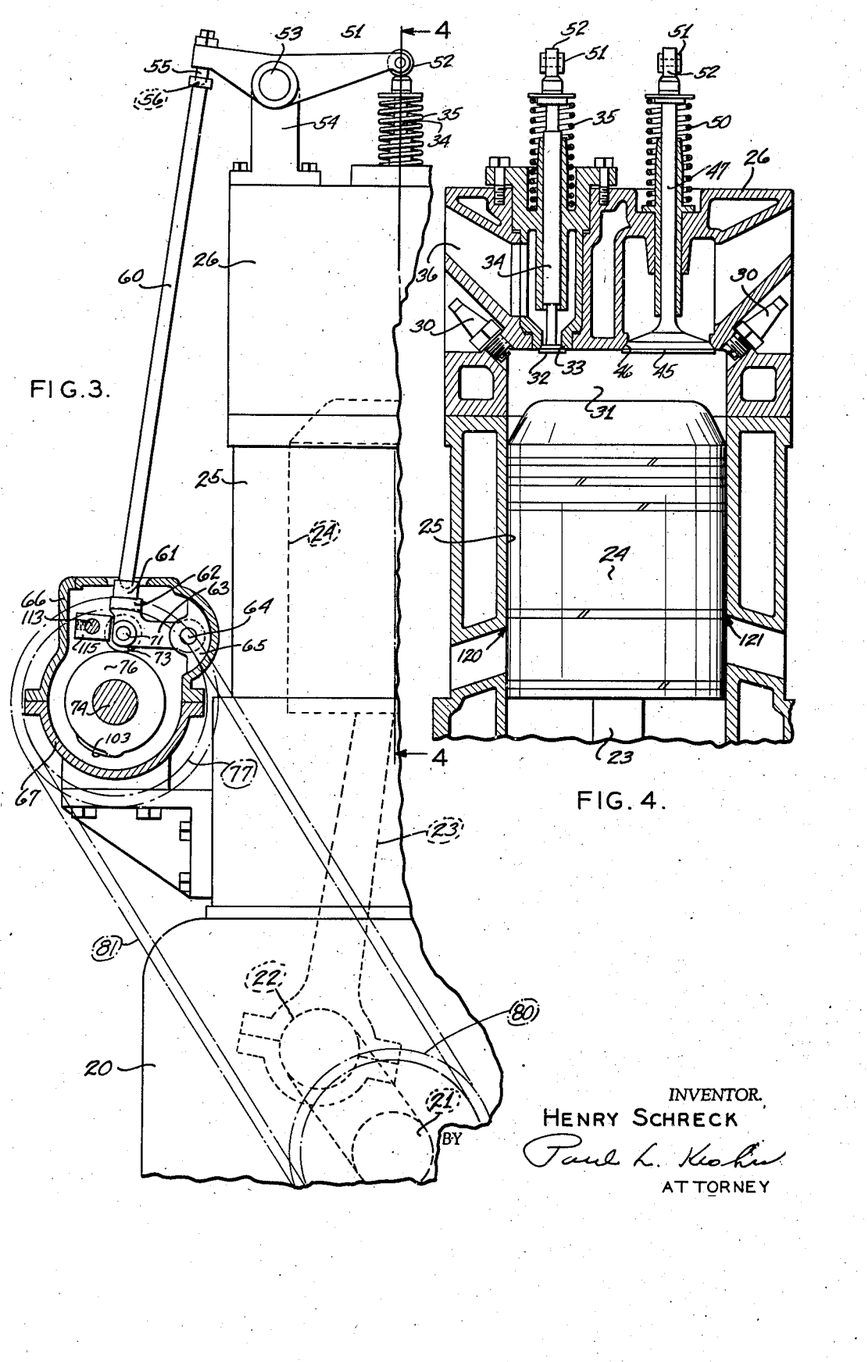
Fig. 3 is a partial end elevation of a vertical engine embodying present improvements, with certain portions sectioned along a vertical plane for clearness of illustration.
Fig. 4 is a fragmentary vertical section through the upper portion, head and valve assembly of a cylinder of the engine shown by preceding figures, and as viewed along line 4—4 of Fig. 3.

It will best appear from Fig. 1 that one of the follower rollers 73 is provided for each cam of the pair provided for each cylinder, only one cylinder being shown for simplicity of illustration. For general completeness of present structure the camshaft is indicated generally by the numeral 74, and alongside each cylinder of the engine, if there be more than one, the camshaft carries, rotatably secured thereto, an air-release or air-metering cam 75 and a gas-admission control cam 76, the profiling and features of which will be hereinafter described in more detail. Since the present disclosure illustrates a two-cycle engine, the camshaft 74 will be driven at crankshaft speed as by any suitable or conventional operative connection to assure correct timing of the camshaft at all times. Illustrative of a suitable camshaft drive, is a sprocket 77 on the camshaft, and a similar sprocket 80 on the crankshaft, the sprockets being operatively connected by a timing chain 81.

For further completeness of description in the example selected, it is noted that the engine is provided with a governor 82, equipped with a regulating arm 83 pivoted at 84, and functionally associated with the cam follower mechanism for governing purposes, as will be later described. The governor 82 is conveniently driven through an assembly of gears, one of which is shown at 85, connected with the governor spindle 86, and another shown at 87, the latter gear being secured to and rotatable with the cam shaft 74 as by a key or the like (not shown). Cam shaft bearings of any desired form are provided within the housing 66—67 and are indicated at 90.

On the end of cam shaft opposite the sprocket 77, is an ignition timing gear 91 meshing with a companion bevel gear 92 which actuates the shaft 93 of ignition distributor 94. The latter unit need be provided only in the event electrical ignition is employed; if this be battery ignition, the unit 94 may consist of a breaker, distributor and coil assembly, or in assemblies without battery current available for ignition, the unit may consist of a magneto, a number of suitable types of which are known in the trade and require no detailed description. If dual ignition be employed, a pair of the units 94 may be operatively associated with the gear 91, as will be readily apparent.

As to ignition instrumentalities other than the device 94, these are or may be of any suitable or conventional form. Ignition timing will depend upon the speed range of the engine, and perhaps other characteristics, but a present preference is to cause ignition within a range of 40° to 25° ahead of top center piston position, as indicated on the diagrams of Figs. 9, 10 and 11.

The general principles involved in the control of the fuel admission and air relief valves, in response to varying load conditions of the engine affecting the governor 82, will be generally apparent by noting that there are provided for each cylinder of the engine at least a pair of rotatable cams; that each of these cams is of a substantially greater axial extent or length along the camshaft, than is the cooperating follower element associated with each of these cams. Each of the cams being of varying effective contouring in different axial zones, it becomes apparent that since the control element of the governor is operatively connected to the followers to cause a coordinated axial displacement thereof, a suitable load regulation is attained. The structural details of an exemplary embodiment of this assembly are hereinafter discussed in more detail.

Figures 5, 6:
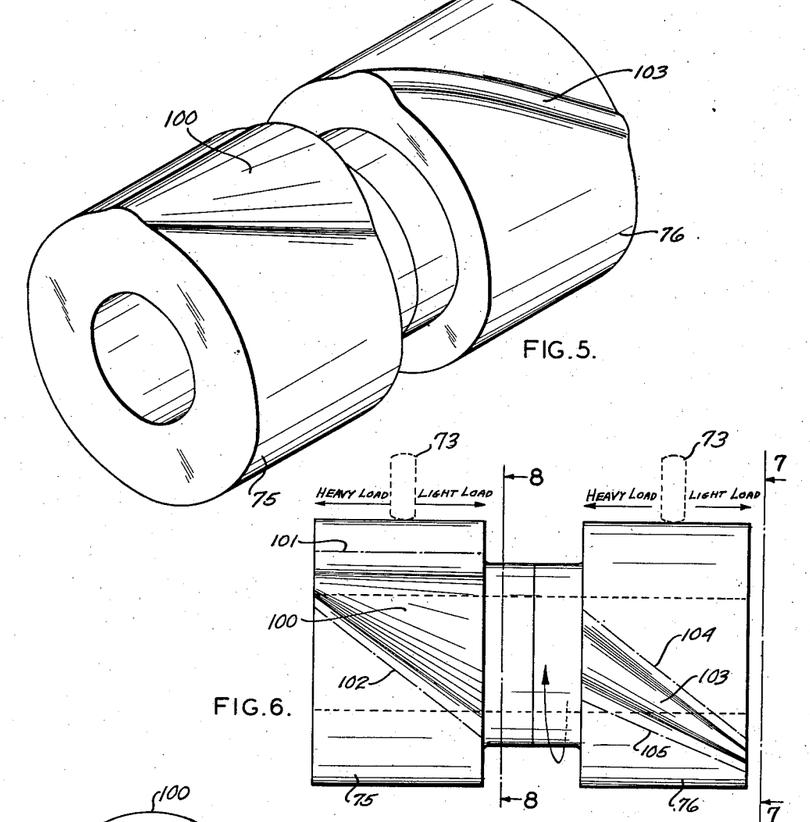
Fig. 5 is an isometric view or perspective elevation of one of the air-release valve operating cams and a companion gas-admission control cam in an exemplifying form.
Fig. 6 is a top or plan view of the cam assembly shown by Fig. 5, in order better to illustrate certain features of the lobe portions of the cams.
Figure 7:
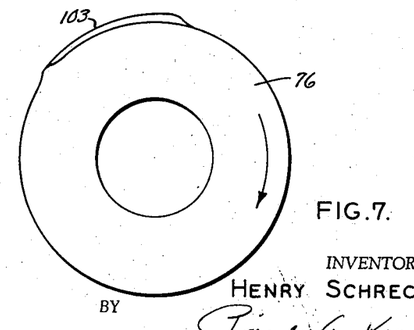
Fig. 7 is an end elevation of the gas admission control cam, as viewed along line 7—7 of Fig. 6.
Figure 8:
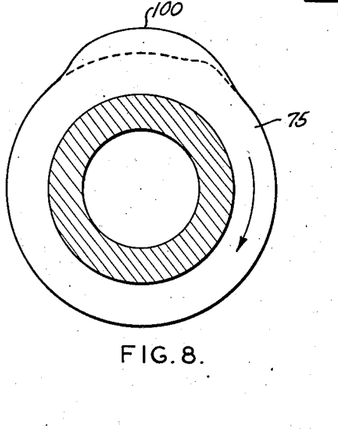
Fig. 8 is an end elevation, partly in section, of the air release valve control cam as viewed along line 8—8 of Fig. 6.

Proceeding now to a more detailed discussion of the presently preferred cam profiling or contour, and the elements cooperating therewith for governed control of gas admission and air metering, it should first be noted that in the selected example both of the paired cams for each cylinder indicated at 75 and 76, are axially and angularly secured to cam shaft 74 and hence these two cams are in constant phase relation. With particular reference to Figs. 5 and 6 it will be noted that each of the cams 75 and 76 is by preference formed, as to the major part of its surface, on a base circle, from which it results that the major area of each cam, engageable by its associated follower roller, is in the form of a base cylinder. To produce the cam action desired to carry into effect the principles and method of operation, it will appear that the air cam 75 is characterized by a lobe portion or follower-actuating area such as the projection generally indicated at 100. It will of course be understood that according to arrangement of valve and valve operating mechanism, the follower-actuating portion 100 may be depressed below the base cylinder, hence characterized or generated by negative rather than positive radial increments of the base cylinder surface. The lobe 100 as shown, is defined, in its portion first engaging the associated follower roller, by a substantially rectilinear zone 101 which is crosswise of the cam or substantially parallel to the cam axis. In plan, the lobe 100 is incompletely triangular in outline if developed to a planar structure, so that its follower-leaving edge, indicated at 102, may be regarded as a rectilinear zone lying at an acute angle to the cam axis. The intervening lobe or follower-actuating area is thus of substantially greater width on one side of the cam than on the other. Furthermore, as will readily appear from Fig. 5, the radial increment resulting in the wider side of the lobe 100 is similarly greater than the radial increment which results in the shaping of the more narrow side of the lobe. This results in a lobe portion of tapered depth from what may be called the light-load side of lobe 100, which slopes downwardly or inwardly, to the heavy-load side of the lobe.

Referring now to the gas-admission cam 76, this too is characterized by a basic cylindrical portion constituting considerably the greater part of the periphery of the cam, and is modified by varying radial increments proceeding axially of the cam, to constitute the lobe or area 103. This cam follower actuating portion is bounded in the portion first engaging the follower, by a rectilinear zone 104 which is at an acute angle to the cam axis, and on the opposite or follower-leaving margin of the lobe by a similar rectilinear zone 105. It is here noted that the zone 104 is, by great preference, exactly parallel to the zone 102 of the air release cam. It will be noted however, that the margins 104 and 105 of lobe 103 are not parallel, from which it results that what may be termed the heavy-load margin of the cam is of appreciably greater angular extent, so as to provide, as will appear, for a longer period of gas admission expressed in relation to linear piston travel or degrees of rotation of cam or crankshaft. There is also by preference, a slight difference in radial increment resulting in the height or depth of lobe 103, between its heavy load and light load ends. As will appear also from Figs. 5 and 6, the major portion of the effective surface of lobe 103 is in the nature of a plateau, so that when the gas cam follower engages lobe 103, it is held at full-open position during substantially the greater part of its opening period.

Referring again to the air-release valve cam, it is further to be noted as a distinct preference, that the follower-leaving portion or zone 102 of the lobe 100 is such as to provide a relatively abrupt shoulder in this zone, from which it results that, as will later appear, at the end of the air metering or air release operation of valve 45, the latter closes extremely abruptly. This is advantageous to prevent "trickling" of the outward moving air stream, which would result in inexact metering and a varying remanent cylinder air charge.

With reference to the means by which the governor 82 through its regulating function, is brought to affect the air-metering cam-and-valve assembly, and the fuel-admission cam-and-valve assembly of each of the cylinders, it may be noted that the governor is preferably of a type susceptible of various speed settings as indicated for example, by the governor speed control lever 110. While the governor 82 may be of hydraulic, centrifugal, or other suitable form, it will be noted that the regulating effect of the governor, in its response to fluctuation in engine loads for a given governor speed setting, is reflected in a rocking movement of the regulating lever 83 about its pivot 84. Through a connecting link 111 pivoted at one end to the arm or lever 83, this movement is imparted, through a pivotal connection 112, to a reciprocating regulating movement of a follower control rod 113, the rod 113 being supported for reciprocal movement, in bearing arms or the like 114. The rod 113 carries in the manner best appearing in Fig. 2, a plurality of small yokes 115, each secured as by a setscrew 116 to prevent axial displacement of the yokes on the control rod 113 as the latter is axially moved under the regulating action of the governor arm 83. It will appear that the inner face portion of each of the yokes 115, is cut away so as to provide a pair of oppositely disposed arms, partly yet loosely embracing the periphery of the associated cam follower roller 73. Through the interengagement of each yoke 115 with a roller 73, it will appear that, as the control rod 113 is shifted under governor action, it will serve to shift, to the same extent, each of the cam follower rollers 73, in one direction or the other, axially of the several cams 75 and 76. Because of the differing profiles of the cams in their several transverse sections, it will be seen that, responsive to different engine load conditions, the follower rollers being of considerably lesser width or axial extent than their cooperating cams, the governor regulation will result in tending to maintain the speed of the engine by metering a charge of less air in the cylinder, and a correspondingly less gas charge in one direction of regulation, and metering an increased air charge remanent in the cylinder for combustion and a correspondingly greater gas charge responsively to regulation with opposite effect.

Figures 9, 10:
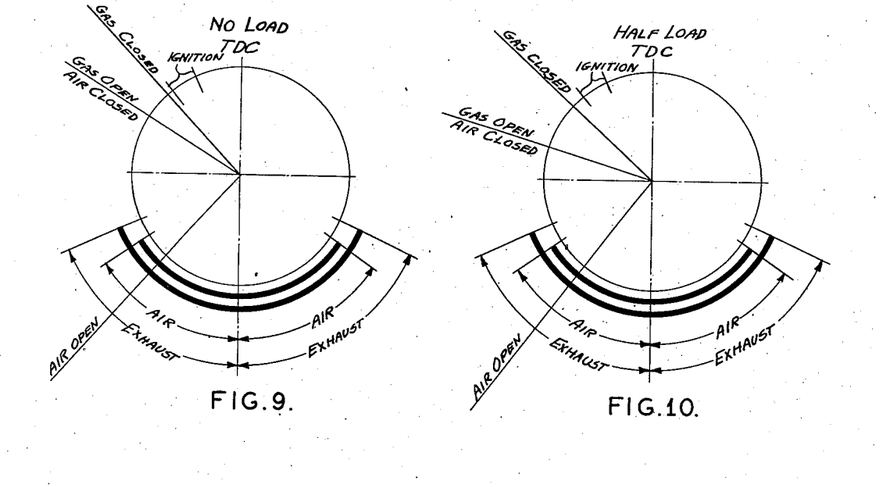
Figs. 9, 10 and 11 are illustrative sector diagrams showing, in reference to different angular positions of the engine crank, the times of opening and closing of the air release valve and the gas admission valve, hence indicating the angular periods, expressed in terms of crank angle, through which air release for combustion air proportioning purposes takes place, and the angular periods through which the introduction of gas occurs, Figs. 9, 10 and 11 being applicable, in order and as designated, to no-load, one-half load and full-load conditions of the engine.
Figure 11:
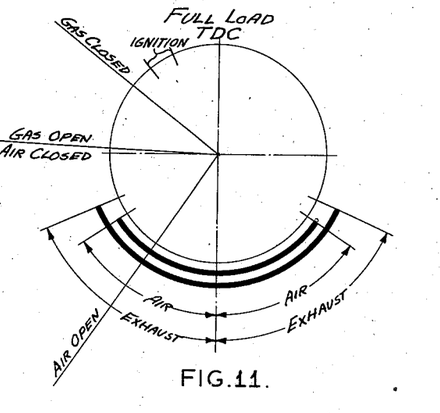

Although the essentials of the method of proportioning both combustion air and gas charge, to then prevailing engine loading, will have been apparent from the foregoing description, it may be further noted, most readily from reference to the sector diagrams of Figs. 9, 10, and 11, and that while these are to be understood as illustrative rather than restrictive, the diagrams, collectively considered, will provide the angular limits between which, according to engine load, air release begins for metering purposes, and likewise, will graphically show the angular limits within which the valve 45 closes, and thus air release is terminated, and the metering operation finally completed. There will similarly appear from the sector diagrams, the angular limits expressed in terms of crank travel on compression stroke, in which gas introduction or injection begins, and in the same fashion the crank angle limits under different load conditions within which gas introduction is terminated. In order to render even more graphic the relation of piston positions to gas valve and air release valve events, these are directly shown in diagrammatic form by figures numbered 13 through 21, being in groups of three figures each corresponding to no load, full load and 120% load.

In order to render more meaningful the sector diagrams of Figs. 9, 10 and 11, it may be noted that each of these showings represents the opening and closing time, expressed in reference to crank angle position or movement, in the compression stroke of a two-cycle port-scavenging engine. It will be understood of course that ignition takes place through one or both of the plugs 30, when the piston 24 is at or somewhat ahead of top center position, valves 32 and 45 both being closed, and the expansive force of the burning charge within cylinder space 31, operating to impel the piston 24 on its inward or working stroke. It will be understood of course that the head of piston 24 when the latter is at inner or bottom center of the working stroke, serves to uncover or clear an air supply port 120 and an exhaust port 121, each of these ports being provided with the usual communicating port passage as shown. As soon as the piston has uncovered or opened ports 120 and 121 substantially over their full areas or an appreciable portion thereof, the opening of port 120 permits a rapid ingress of scavenging and combustion air which first clears the cylinder space 31 of spent gases, expelling same through the exhaust port 121 and leaving the cylinder space 31 filled or substantially filled with its full capacity of fresh combustion air.

As the piston 24 again ascends, and covers ports 120 and 121 there is entrapped ahead of the piston a full charge of fresh air. However, at about this time, the cam follower roller 73 first engages the zone 101 of the lobe 100 of air release cam 75, opening valve 45. The piston now moving toward the cylinder head in an upward or outward direction, continues to expel a portion of the air until such time as the valve 45 closes as determined by the time when the cooperating follower roller 73 moves off of the abrupt shoulder in zone 102 of cam lobe 100. This time of release valve closing, as will have appeared and later be discussed, is variable according to load.

Immediately or only slightly after the air release valve 45 is closed, as above described, it will appear that the follower roller 73 cooperating with lobe 103 of cam 76, first engages the zone 104 of lobe 103 and the gas valve is initially opened. The gas being supplied by the gas pump or otherwise under substantial pressure sufficient to impel the gas into the cylinder under any degree of compression, is injected into the cylinder for a duration measured by the transverse extent of the cooperating portion of gas-cam-actuating lobe 103 on cam 76, gas injection terminating when the gas-cam follower-roller leaves the zone 105 through rotation of cam 76. The duration of gas admission valve opening is variable according to load, as will have appeared. The extent of valve opening is also variable according to differing load conditions of the engine as has been mentioned heretofore, and because of the bias relation of zones 104 and 105 with respect to the axis of cam rotation, the timing of both opening and closing of the gas admission valve is varied according to the existing axial position of its cooperating follower roller and hence is different in accordance with differing engine loads. This difference is graphically indicated by a comparison of the lesser and greater periods of gas injection apparent from a comparison of Figs. 13 and 19.

Air now having been accurately metered in the cylinder by releasing an accurately predetermined amount from the initially constant cylinder volume, there remains an amount correctly proportioned to then-existing engine load conditions, and the gas having been just admitted and proportioned to the amount of air in the cylinder as the piston approaches or attains its top center position, the charge is ignited either electrically through plug 30, or by heat of compression, or otherwise. As well known, the expansion of the now burning charge in the cylinder, again impels the piston downwardly during the power stroke of the engine in general accordance with recognized two-cycle operation.

It will have appeared from the foregoing description and the relation of the air release cam lobe 100 to its follower roller, that closing of the air release cam 45 takes place at points in piston travel during the compression stroke which are variable according to load conditions. Since there is no effective compression of the air charge in the cylinder, until after closing of valve 45, which occurs at different points along the path of piston travel according to load conditions, the metered charge in the cylinder will as an incident of the described mode of cylinder charging practice, begin to be compressed earlier or later in the compression stroke. This difference, under differing loads, will most readily appear from the three pressure diagrams, Figs. 15, 18 and 21.

To describe in some further detail and to enable a better visualization of the difference in functional relation of the different portions of the cam lobes 102 and 105 and their respective followers 73, reference is particularly directed to Figs. 5 and 6. In the latter figure suitable legends and small solid line arrows indicate with respect to each cam, the direction of axial displacement of the cooperating follower 73, toward the left in the figure as engine loading increases, and toward the right in the figure as lighter loads are imposed on the engine. The extreme right hand peripheral portion of each cam (Fig. 6) may be taken as representing a no-load or negligible load. Although it will be understood that the followers are reciprocated in substantially the same vertical plane, having only a small arcuate movement, it is believed clearer to consider the relative movement of followers with respect to cam lobes as taking place in the direction shown by dotted arrows in Fig. 6. It will have been noted from Figs. 1 and 2, that the follower rollers 73 are characterized by a convex periphery, from which it results that the actual area of engagement of each follower with its cooperating cam, is little more than a point contact at a given instant. This fact, considered with the variation of slope in several directions, on each of the lobes 100 and 103, will account in part for the nicety of regulation actually attained in practice.

By way of example let it be supposed that the cams are in rotation during engine operation and that the follower roller acting on the air release cam, under light or zero load conditions, approaches the zone 101, is there gradually lifted, shortly thereafter is lifted to, or nearly to its maximum extent, thus opening the valve 45. The follower, thereafter riding on the longest portion and the deepest portion of lobe 100, will be held open to its full maximum, for the maximum interval, expressed in terms of crank angle, thus releasing the maximum volume of air and metering the air remanent in the cylinder to the minimum desired for zero or substantially light load operation. When the follower roller leaves lobe 100 in the zone 102, an abrupt termination of opening of valve 45 takes place because of the relatively sharply shouldered shaping of zone 102, this quick termination making for most accurate metering.

Considering the air release valve operation in the other extreme engine loading, it will be noted that with the follower engaging the left hand portion (Fig. 6) of lobe 100, the air release valve will begin to open at the same time as under the preceding condition, but will be held open for a duration, in terms of crank angle, which is at a minimum. A minimum of air thus being released, nearly a full cylinder charge will be retained. Termination of air release is equally abrupt as above described. It will be noted that the relatively shallower portion of lobe 100 near the heavy load end of the cam results in air emission at a somewhat reduced rate, because of the lesser extent of opening of valve 45. The zone 102, being rectilinear in form although biased with respect to the axis of cam revolution, will result in an optimum variation in extent of air released, between light load and heavy load conditions as graphically represented, and as will further appear from the shaping of the lobes as illustrated.

The action of the gas-cam-actuating portion or active profile 103 thereof on its follower element is somewhat the same as heretofore described, with the important exception that the zone 104, being sloped or biased with respect to the cam axis, results in an early and late valve opening effect according to variation in engine load. The effect of this is readily apparent from the differing stroke lengths of the "gas injection" arrows shown by Figs. 13, 16 and 19. It will be noted also that while there is preferably a slight difference in radial depth of the lobe 103, or radial increment of cam 76 from end to end of lobe 105, this difference is only slight, and not nearly as marked as in the case of lobe 100 controlling the air release valve. It will have been apparent that as a result of this greatly differing depth of lobe portion 100, there exists a considerable difference in rate of release of air, between no-load and full-load conditions, whereas the difference in rate of gas introduction is much less marked between no-load and heavy loading of the engine. It is of advantage however that the contouring of lobe 103 be such that it exhibits what may be termed a plateau over the greater portion of the lobe or active surface. This profiling is obviously such that the gas admission valve is soon brought to full-open positon, is held there for the greater part of the angular duration represented by distance between zones 104 and 105, and again brought to closed position.

Since in the example illustrated the followers 73 operate on an axis which is parallel to that of the camshaft, a straight line may be drawn parallel to the camshaft axis and intersecting both of the lobes 100 or 103, thus indicating, since the cams are fixed phase relation, the relative timing of the valves 32 and 45 as to opening and closing at any time during the compression stroke.

Figure 12:
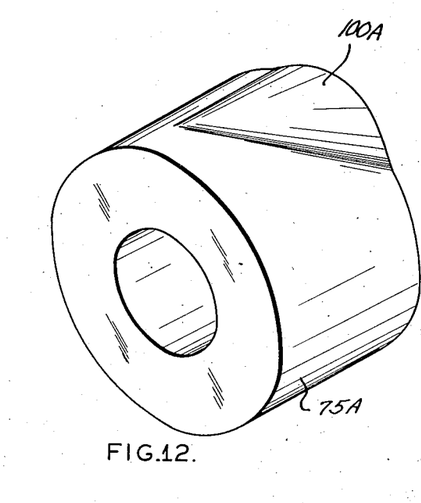
Fig. 12 is an isometric view of a slightly modified form of air-release control cam.
Figure 13:
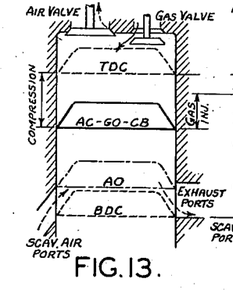
Figure 14:
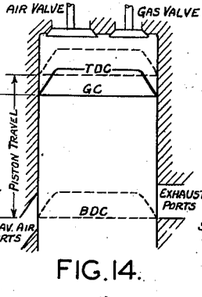
Figures 15, 21:
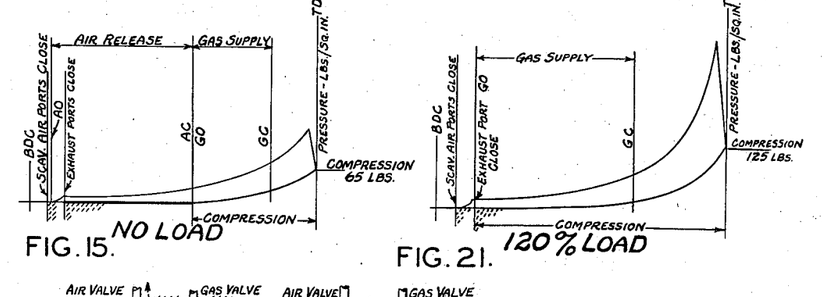
Figures 16, 17, 18:
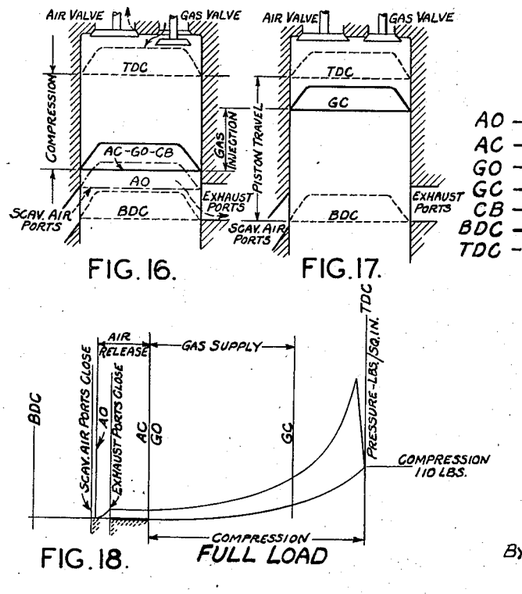
Figs. 16, 17 and 18 correspond, as a group, in nature and purpose, respectively to Figs. 13, 14 and 15, except showing piston positions, valve events, and exemplary cylinder pressures under conditions of full rated engine load, and Figs. 19, 20 and 21 constitute a group corresponding in nature and purpose to Figs. 13, 14 and 15 respectively, but show piston positions, valve events and exemplary cylinder pressures under conditions of 120% rated load.
Figure 19:
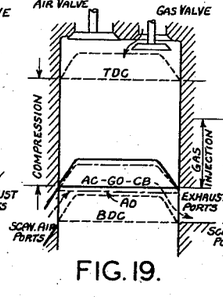
Figure 20:
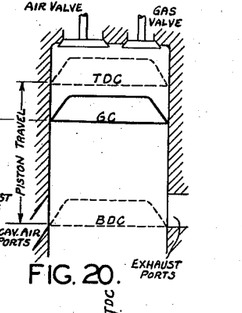

The description of a somewhat modified form of air release control cam as shown by Fig. 12, has been deferred until the present portion of description for a better understanding of purpose thereof. The modified form of air release cam is indicated at 75A, and corresponds in all important respects, with one exception noted hereinafter, to the structure and profile formation of cam 75, the general purpose of operation of cam 75A, being likewise similar to that of cam 75. In the modified form the several features of structure heretofore indicated and described in reference to cam 75, bear the same reference numerals in respect to cam 75A, with the addition of the suffix letter. The noteworthy difference between the principal and modified showings lies in the fact that, in Fig. 12, the lobe area or profile portion 100A, is of slightly lesser axial extent than is lobe portion 100. It will appear from Fig. 12 that the active profile area 100A terminates somewhat inwardly of the heavy-load margin of the cam 75A, thus resulting in a marginal portion characterized by the absence of any profile or contouring but consisting of a portion formed on the cam base circle, through a full 360 degrees. From the foregoing description of the regulation afforded by cam 75 it will appear that in case cam 75A be substituted therefor, the heavy-load margin of 75A will, when engaged by the companion follower roller, result in no lifting whatever of the air release cam, thus providing, as may be desirable in certain engines, an effect under full load or overload engine conditions in which the full initial cylinder volume of air is retained for combustion purposes. It is to be noted, however, that when the follower which coacts with cam 75A, is, by governor regulation, brought over the lobar area 100A, the function of the modified cam and follower on the air relief valve is the same as heretofore described in reference to cam 75.

Although some minor modifications of the lobe or profile portions 100, 100A and 103 may be made to care for gases of different burning characteristics, and engines of different operating requirements, the principles of shaping the active cam portions to result in the described method of operation, particularly as to proportioning of gas and air, may remain essentially the same irrespective of changes in engine speed range or other operating conditions, and irrespective of changes in gaseous fuel, the latter being compensated for as heretofore briefly mentioned, by substitution of differing sizes of valves 32, seats 33, and cages or head structures.

The specific reference to a preferred embodiment is not to be understood as limiting, but merely as illustrative of the structural possibilities within the appended claims; however, since the present improvements are peculiarly applicable to true gas engines, being those operating primarily on permanent fuel gases, such as natural gas, illuminating gas, bottle gases, or producer gas among other true gaseous fuels, it is intended that the present claims shall relate solely to gas engines as hereinbefore defined. Accordingly, there are hereby diclaimed any and all engines, the principal sources of fuel of which are carbureted or vaporized fuels or air mixtures thereof, or injected liquid fuels.

I claim as my invention:

1. In a gas engine of two-cycle type, a cylinder, a piston therein, said cylinder having an air admission port and an exhaust port opened and closed by the piston, a gas admission valve, means for supplying to said valve a true gaseous fuel, an air metering valve opening only after the exhaust port has closed, operating means for said valves including a cam operatively associated with each of said valves and followers coacting with the cams and valves, a governor, the followers and cams being arranged for relative displacement by the governor under influence of changes in an engine operating condition, the operating means associated with one of said valves being of differing regulable valve-opening and closing characteristics such as to provide different durations of opening of the associated valve, and further such as to provide for a relatively earlier and later valve opening and a differentially earlier and later closing, under the regulating influence of the governor, the operating means for the gas and air valves being relatively timed to effect substantially sequential operation of the metering valve and admission valve, whereby the air supply is accurately metered in the cylinder shortly prior to gas introduction thereto, and the valve operating means further being timed for effective air metering and gas admission, following closure of the exhaust port.

2. In a gas and air control assembly for a two-cycle engine supplied with a true gaseous fuel, as herein defined, a gas admission valve, piston controlled air supply and exhaust ports, an air metering valve, a pair of cams, one for actuating each of said valves, operable in timed relation by the engine and in fixed phase relation to each other for substantially sequential operation of the valves, a follower for each of said cams, coacting therewith and operatively arranged for actuation of the associated valves, the cams being relatively so disposed and timed so as under all load conditions to close the air metering valve at least as early as opening of the gas admission valve, and to provide for opening of said gas valve only after the exhaust port is closed, and close to the beginning of compression, a governor, a connection from the governor to the followers for shifting the followers axially with respect to the cams, the gas valve cam being characterized by a profile or nose which is arranged to engage the associated follower in later timed relation at low engine loads and relatively earlier timed relation at high engine loads, and which is further designed to leave the follower later at lower engine loads and earlier at higher engine loads, as the follower is influenced by the governor corresponding to the variations in engine operating conditions, the air-metering valve-operating cam being characterized by a profile or contour which is of greatest effective width in its area encountered by the associated follower at relatively lower engine loads and of lesser effective width in the area encountered by its follower at higher engine loads.

3. In a two-cycle internal combustion engine assembly, a cylinder, a piston operable therein, said cylinder having a port for admission of scavenging and combustion air, means for supplying to the engine a fuel of true gaseous type including a fuel admission valve and an exhaust port, both ports controlled by said piston, separate valve means coacting with the cylinder and piston for metering the air charge in the cylinder effective only after closure of the exhaust port by releasing a predetermined portion of said air charge, engine-timed means for regulating the portion of air thus released in accordance with requirements of engine load and for regulating a succeeding fuel charge next to be admitted for combustion, and engine actuated means operable substantially sequentially and in substantially uniformly timed relation to said air charge metering means for metering and admitting to the air charge, after complete admission of combustion air and accurate air metering, a charge of said gaseous fuel through the fuel admission valve to the cylinder, said last means being responsive, as to admission of fuel quantity, to current engine load condition.

HENRY SCHRECK.